United States Patent
Podilchuk

(10) Patent No.: US 7,869,657 B2
(45) Date of Patent: Jan. 11, 2011

(54) SYSTEM AND METHOD FOR COMPARING IMAGES USING AN EDIT DISTANCE

(75) Inventor: Christine Podilchuk, Warren, NJ (US)

(73) Assignee: D & S Consultants, Inc., Eatontown, NJ (US)

( * ) Notice: Subject to any disclaimer, the term of this patent is extended or adjusted under 35 U.S.C. 154(b) by 1045 days.

(21) Appl. No.: 11/619,092

(22) Filed: Jan. 2, 2007

(65) Prior Publication Data

US 2007/0286497 A1 Dec. 13, 2007

Related U.S. Application Data

(60) Provisional application No. 60/812,646, filed on Jun. 12, 2006, provisional application No. 60/816,686, filed on Jun. 27, 2006, provisional application No. 60/861,685, filed on Nov. 29, 2006, provisional application No. 60/861,932, filed on Nov. 30, 2006, provisional application No. 60/873,179, filed on Dec. 6, 2006.

(51) Int. Cl.
*G06K 9/68* (2006.01)

(52) U.S. Cl. .................. 382/218; 345/419; 382/103; 382/118

(58) Field of Classification Search .................. 345/419; 382/190, 218

See application file for complete search history.

(56) References Cited

U.S. PATENT DOCUMENTS

| | | | |
|---|---|---|---|
| 5,459,739 A | 10/1995 | Handley et al. | |
| 5,757,959 A | 5/1998 | Lopresti | |
| 5,761,538 A | 6/1998 | Hull | |
| 5,832,474 A | 11/1998 | Lopresti et al. | |
| 6,295,371 B1 | 9/2001 | Rucklidge | |
| 6,581,034 B1 | 6/2003 | Choi | |
| 6,616,704 B1 | 9/2003 | Birman et al. | |
| 6,668,082 B1 * | 12/2003 | Davison et al. | 382/190 |

(Continued)

FOREIGN PATENT DOCUMENTS

EP 0949580 A3 2/2001

OTHER PUBLICATIONS

Bhatnagar, et al., "Syntactic Pattern Recognition of HRR Signatures", SPIE Proc. vol. 4053, 190, pp.452-466, Society of Photo-Optical Instrumentation Engineers, Bellingham, WA (2000).

(Continued)

*Primary Examiner*—Gregory M Desire
(74) *Attorney, Agent, or Firm*—Fox Rothschild; Dennis M. Carleton

(57) ABSTRACT

A system and method for comparing images by calculating an edit distance between the images using the results of matching portions of one image to the other. The first image is divided into blocks of pixels. For every block of pixels, a closest match is found in the second image. Substitution is equated to the sum of the errors in the closet matches. Deletion is equated to the percentage of the second image not involved in any of the matching. Insertion is equated to the percentage of the second image simultaneously involved in matching more than one block. The image edit distance may then be calculated as the weighted sum of the insertion, deletion and substitution. Recognition may be done by finding a minimum edit distance between an image of an unknown object and a set of reference images.

20 Claims, 5 Drawing Sheets

U.S. PATENT DOCUMENTS

2005/0012757 A1* 1/2005 Park et al. .................. 345/582
2006/0115922 A1* 6/2006 Araya et al. .................. 438/61

OTHER PUBLICATIONS

Oommen, et al., "On Using Parametric String Distances and Vector Quantization in Designing Syntactic Pattern Recognition Systems", IEEE Proc. International Conference on Systems, Man and Cybernetics, vol. 1, pp.511-517, IEEE, Piscataway, NJ (1997).

Podilchuk, et al., "A New Face Recognition Algorithm Using Bijective Mappings", Proceedings of 2005 IEEE Computer Society Conference On Computer Vision and Pattern Recognition, Jun. 20-26, 2005, vol. 3, pp. 165-165, (USA).

* cited by examiner

SYSTEM AND METHOD FOR COMPARING IMAGES USING AN EDIT DISTANCE

CROSS REFERENCE TO RELATED APPLICATIONS

This application is related to, and claims priority from, U.S. Provisional Patent application No. 60/861,685 filed on Nov. 29, 2006 by C. Podilchuk entitled "New object/target recognition algorithm based on edit distances of images" the contents of which are hereby incorporated by reference.

FIELD OF THE INVENTION

The present invention relates to systems and methods for comparing images, and more particularly to systems and methods for calculating an edit distance between images and the use of that image edit distance in feature and object recognition.

BACKGROUND OF THE INVENTION

A minimum edit distance is a well-know and powerful concept widely used in comparing strings of data, i.e., data that is capable of being represented as a one-dimensional string of symbols, such as text or DNA or protein sequences.

The minimum edit distance between two strings, also known as the Levenstein distance, is defined as the weighted sum of deletions, insertions and substitutions required to transform the one string into the other string. The minimum edit distance provides a measure of how similar the two strings are to each other.

Comparing strings of data by finding the minimum edit distance between them has been found to be useful in a wide variety of problems including, but not limited to, searching in texts, correcting spelling, matching DNA sequences, speech recognition and handwriting analysis. As a result there is a rich array of related techniques and algorithms including methods for rapidly calculating minimum edit distances.

Use of the minimum edit distance technique in searching and matching DNA and protein sequences is described in detail in, for instance, U.S. Pat. No. 5,701,256 issued to Marr et al. on Dec. 23, 1997 entitled "Method and apparatus for biological sequence comparison", the contents of which are hereby incorporated by reference. The application of minimum edit distance techniques to text searching and matching, particularly spelling correction, is described in, for instance, U.S. Pat. No. 6,616,704 issued to Birman, et al. on Sep. 9, 2003 entitled "Two step method for correcting spelling of a word or phrase in a document" the contents of which are hereby incorporated by reference.

Attempts have been made to extend the minimum edit distance concept to images to solve problems in comparing images. One approach to obtaining an image edit distance, for instance, has been to first create a histogram of hues form the image. An edit distance may then be determined between the histograms of the images as described in, for instance, a technical report by S. Cha et al. entitled "Algorithm for the edit distance between angular type histograms" in the proceeding of the International Society for Optical Engineering proceedings (SPIE) on Storage and Retrieval for Media Databases 2003 (Santa Clara Calif., 22-23 Jan. 2003), the contents of which are hereby incorporated by reference. Another approach to creating an image edit distance has been to first create containment graphs representing features within an image and their spatial relationship to each other, and to then obtain edit distances between the graphs, as described in, for instance, a paper by Kailing et al entitled "Content-Based Image Retrieval Using Multiple Representations" published in the Proc. $8^{th}$ Int. Conf. on Knowledge-Based Intelligent Information and Engineering Systems (KES'04), Wellington, New Zealand, LNAI 3214, pp 982-988, 2004, the contents of which are hereby incorporated by reference.

The histogram based attempts at creating image edit distances do not adequately reflect the spatial relations of features within an image, while the graph based efforts tend to be difficult to generalize and automate. In effect, these attempts at extending the image edit distance to images begin by transforming the image into a one dimensional representation and then apply the edit distance to that one dimensional representation.

What is needed is a system and method for determining an edit distance between arbitrary images that adequately reflects the spatial relations of features within the images and that can be calculated automatically and easily and is preferably not dependent on first transforming the image into a one dimensional relationship. Such an image edit distance is likely to be of great value in comparing images and useful in applications such as, but not limited to, pattern or object recognition, including face recognition, image classification and video tagging.

SUMMARY OF THE INVENTION

Briefly described, the invention provides a system and method for comparing images by calculating an edit distance between the images based on the results of matching portions of one image to the other.

In a preferred embodiment, to find an edit distance between a reference or gallery image and a candidate or probe image, the gallery image is divided into blocks of pixels. For every block of pixels in the gallery image, a closest match is found in the probe image. Substitution may be equated to the errors in the block matches. Deletion may be equated to the portion of the probe image not involved any of the closest matches. Insertion may be equated to the portion of the probe image involved in two or more matches. The edit distance from the gallery image to the probe image may then be determined as a weighted sum of the insertion, deletion and substitution, or some suitable combination thereof.

The block matching may be done by any suitable block matching technique including, but not limited to, fixed or variable sized block matching that, for instance, looks for a matches to within some predetermined threshold. The block matching may be based on either the mean square difference of the pixel values, or the mean absolute difference, or some suitable combination or variant thereof. In a preferred embodiment, the block matching algorithm may be modified by a multiplicative term that compensates for illumination variation between images. The block matching may be attempted over the entire image or it may be confined to a sub-region of the image that may correspond to where the block occurred in the gallery image.

In a further preferred embodiment of the invention, the edit distance may further include the probe-image-to-gallery-image edit distance, which is typically not the same as the gallery-image-to-probe-image edit distance. The probe-image-to-gallery-image edit distance may use the insertion, deletion and substitution of mapping the probe image to the gallery image.

These and other features of the invention will be more fully understood by references to the following drawings.

DETAILED DESCRIPTION

Figure 1:
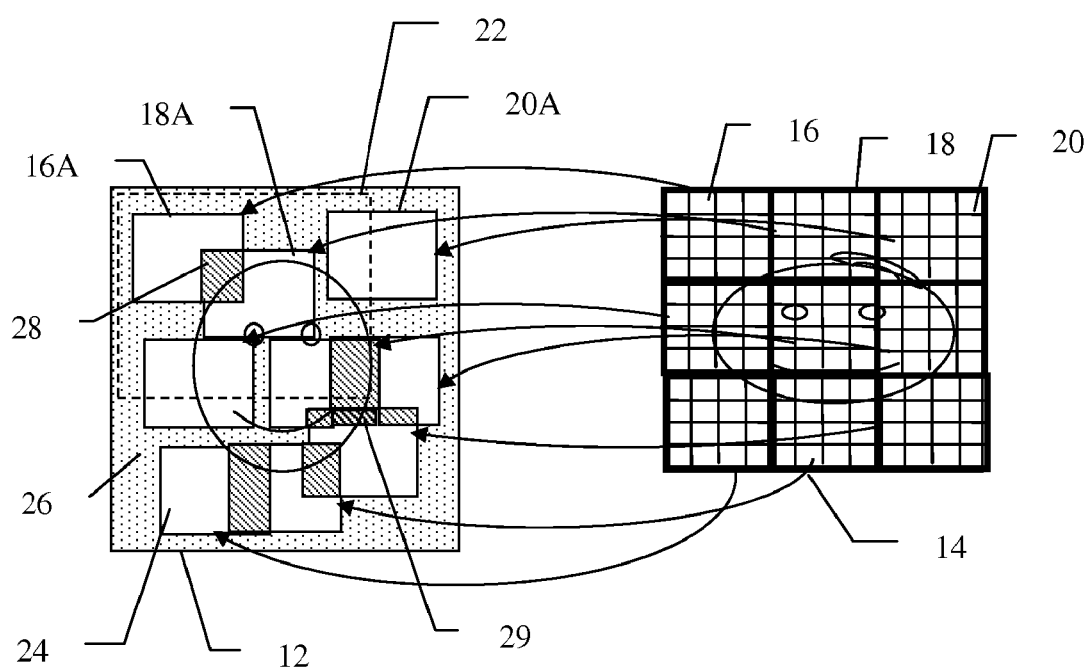
FIG. 1 is a schematic representation of creating an edit distance by matching blocks of pixels from one image to a second image.

The present invention relates to a system and method for comparing images that may be used on still images, or video images, and that is robust to variations in pose, illumination, camera angle and changes in facial expression. The method of image comparison relies on an image edit distance that is a weighted sum of insertions, deletions and substitutions derived from mapping portions of one image to the other. The image edit distance effectively determines a degree of similarity between images. Two images that have a small image distance between them are more likely to be of a similar object than two images that have a large image distance between them.

Edit distances are well known and widely used in text searches and other searches where the data can be represented by a one dimensional string of discrete symbols such as letters and numbers, but hitherto have not been successfully applied to image or volumetric data.

In the system and method of this invention, a mapping is found between a probe image and a gallery image and the properties of that mapping that represent insertion, deletion and substitution are used to define an image edit distance between the two images. In particular, in a preferred embodiment, insertion may be equated to regions of one-to-many mapping, deletion to regions of one-to-none mapping and substitution to the errors in the regions of one-to-one mapping.

A system and method of image comparison based on such an image edit distance can, for instance, be used in a wide range of applications including, but not limited to, face recognition applications in which an image of a person can be compared to a database of images to see if the image edit distance between the person is sufficiently small to constitute recognition. Such a method of comparing images may, for instance, be used as a biometric identification or authentication for physical and logical access control, face recognition of a watch list as well as tracking of individuals in, for instance, a surveillance video. The system and method may also be used to track objects such as, but not limited to, suitcases or weapons in video surveillance applications, or for monitoring suspicious behavior. Image comparison using an image edit distance may also be used in entertainment applications such as seeing how closely individuals match celebrities or other family members. The system and method of this invention may also be applied to tagging video sequences with information such as links to websites, product links, ownership, copyright information, target location and identification, and image and object description.

Moreover, most of the traditional metrics that have been used for the one-dimensional string problems such as, but not limited to, Euclidean, mean censored Euclidean, Bray-Curtis and Canberra distance measures may be applied to analyzing the image edit distance. In addition, binary similarity measures such as, but not limited to, the Jaccard, Sorensen, Simple Matching Coefficient, Baroni-Urbani and Buser methods, may also be applied to the image mappings.

The image edit distance method of comparing images does not depend on accurate detection of key features that may be object specific. This is in marked contrast to traditional, feature based image recognition systems in which the features extracted from the data, such as hue histograms or feature graphs, are used for the classification of the objects. For example, a traditional face matching system that is designed to locate the eyes, the mouth and the nose, and to extract relationships between those features, is unlikely to be useful for the recognition of cars or missiles.

The image edit distance technique of comparing images may also be made robust to variations in lighting and poses which is useful for many applications in which the capture of video and still image data occurs in an uncontrolled environment, including many applications where surveillance cameras are used. The image edit distance method of comparing images does not necessarily rely on training data either to build a reliable model or to train the classifier. An image comparison system based on image edit distance may be made fully automatic and does not necessarily require manual feature detection either for training or recognition.

In a preferred embodiment, the mapping used in determining the image edit distance is the block matching algorithm used for motion estimation in current video coding standards such as the well known MPEG 4 standard codified by the Motion Picture Expert Group (MPEG) of the International Organization for Standardization (ISO) based in Geneva, Switzerland. The mapping between probe gallery images can be applied in a "forward" direction where the mapping found which converts the probe image into the gallery image as well as in a "backward" direction where the mapping is found that converts the gallery image into the probe image. The forward and backward mappings are not simply the inverse of one another. The block matching algorithm was first introduced to perform motion estimation and compensation for video compression in order to take advantage of temporal correlations between video frames by estimating the current frame from the previous frame. In a hybrid video coder based on the traditional motion compensation scheme, motion estimation is performed by matching blocks between the original frame and the previously reconstructed frame. An estimate of the current block can be obtained by searching similar blocks in the previous encoded (or original image) frame in a predetermined search area. The block matching algorithm is used for motion estimation between two video frames for compression. In the present invention, the block matching algorithm is used as the basis for determining the minimum edit distance between the probe image and each gallery image.

A preferred embodiment of the invention will now be described in detail by reference to the accompanying drawings in which, as far as possible, like elements are designated by like numbers.

Although every reasonable attempt is made in the accompanying drawings to represent the various elements of the embodiments in relative scale, it is not always possible to do so with the limitations of two-dimensional paper. Accordingly, in order to properly represent the relationships of various features among each other in the depicted embodiments and to properly demonstrate the invention in a reasonably simplified fashion, it is necessary at times to deviate from absolute scale in the attached drawings. However, one of ordinary skill in the art would fully appreciate and acknowledge any such scale deviations as not limiting the enablement of the disclosed embodiments.

FIG. 1 is a schematic representation of matching blocks of pixels from one image to a second image. In order to compare a probe image 12 to a gallery image 14, the gallery image 14 is divided into a number of blocks. In FIG. 1, the gallery image 14 has been divided into nine equally sized blocks and the top most three galley blocks have been labeled as galley block 16, galley block 18 and galley block 20.

In order to calculate an image edit distance, each of the blocks from the gallery image 14 is matched into the probe image 12. This matching may, for instance, take the form of correlating the gallery block over a region of the probe image 22 looking for the best match by, for instance, minimizing the sum of the absolute values of the pixels. In FIG. 1, the block of pixels 16 from the gallery image 14 is matched to a corresponding block of pixels 16A in the probe image 12 that is the best match. Similarly, the block of pixels 18 from the gallery image 14 is matched to a corresponding block of pixels 18A in the probe image 12 and the block of pixels 20 from the gallery image 14 is matched to a corresponding block of pixels 20A in the probe image 12. This matching is repeated for all the blocks of pixels in the gallery image 14. The sum of the matching errors between the blocks of pixels from the gallery image 14 and their corresponding blocks of pixels in the probe image 12 may then be recorded as a substitution.

The substitution may be equated to the actual error measures from the block matching, the count of errors above a predetermined threshold or the actual error values above a certain threshold or in a predetermined range. The substitution may also be associated with some measure of a locally determined scalar value that compensates for the illumination differences. It may, for instance, consist of using the values directly or using a measure of smoothness such as the first order difference between the scalar values.

Once all the corresponding blocks of pixels in the probe image 12 that correspond to the blocks of pixels that make up the gallery image 14, the probe image 12 may be examined for regions in which there are no matches 26 and regions in which there are multiple matches 28.

The regions of the probe image 12 in which there are no matches 26 are shown in FIG. 1 by a dotted pattern and represent the areas of the probe image 12 that never get selected to match the gallery image 14 that is being reconstructed. The regions in which there are no matches 26 may also be termed the one-to-none mapping regions and may be equated to deletions for the purposes of determining an edit distance. For instance, the deletion may be equated to the percentage of the probe image 12 that are regions in which there are no matches 26, i.e., to the percentage of the probe image 12 that is not used in making any of the matches to the gallery blocks.

The regions of the probe image 12 in which there are multiple matches 28 are shown in FIG. 1 by a shaded pattern and represent the blocks, sub-blocks or pixel regions that are the best match for more than one block of the gallery image 14 that is being represented or reconstructed. The regions in which there are multiple matches 28 may also be termed the one-to-many mapping regions and may be equated to insertions for the purposes of determining an edit distance. For instance, the insertion may be equated to the percentage of the probe image 12 that are regions in which there are multiple matches 28, i.e., to the percentage of the probe image 12 that is used in making more than one match to gallery blocks.

In a further embodiment of the invention, regions in which there are more than one multiple match 29, shown in dark shading in FIG. 1, may have an additional weighing factor attached to them when determining insertions. The pixels in the more than one multiple match 29 may, for instance, be weighted proportional to the number of multiple matches, so that, for instance, if they are involved in two matches they may be counted once, if they are involved in three matches they may be counted twice, if they are involved in four matches they may be counted three times and so on, or using some related suitable formula.

An image edit distance may be calculated as a weighted sum of the amount or degree of insertion, deletion and substitution involved in mapping the gallery image to the probe image, or some suitable combination thereof. This image edit distance may then be used as a measure of how similar the images are.

In a preferred embodiment of the invention, the reverse process of mapping blocks from the probe image 12 to the gallery image 14 may also be performed and the image edit distance may be calculated as the weighted sum of the combined amount of insertion, deletion and substitution, or some suitable combination thereof.

The mapping of a block of pixels 16 taking from the gallery image 14 in the probe image 12 may be done by any suitable mapping system. In a preferred embodiment, the mapping uses a block matching algorithm (BMA) that assumes simple translational motion or disparity within the image plane which is constant over a small block size. A straightforward variation of the BMA is the full search algorithm (FS) or exhaustive search algorithm which finds the best match by exhaustively searching every pixel location within a predetermined search range 22. The image to be represented is partitioned into distinct blocks, and a match is found for each block within a specified search area in the search image.

The most commonly used cost functions for the block matching algorithm are the mean square error (MSE) or L2 norm and the mean absolute difference (MAD) or L1 norm. In a preferred embodiment of the invention, the L1 norm is used because it is usually more robust to outliers and computationally less expensive. Moreover, the MAD has also been found to provide better recognition performance than MSE in many database sets. In order to make the BMA robust to changes in illumination and pose, in a preferred embodiment, the MAD cost function may be modified to include a multiplicative term a(i,j) for illumination variations, so that the modified block matching criterion becomes:

$$E(d_i, d_j) = \sum_{\substack{search \\ region}} |Y(i,j) - a(i+d_i, j+d_j) X(i+d_i, j+d_j)|$$

where Y is the image to be represented, X is the search image to be mapped into the image Y, and a is assumed to be a constant over a small region (M×N) and is solved by least squares i.e.

$$Y(i,j) = a(i+d_i, j+d_j) X(i+d_i, j+d_j)$$

$$0 \leq i \leq M-1$$

$$0 \leq j \leq N-1$$

Note that the block size does not have to be identical for illumination and disparity estimation. For the images that we have processed with a resolution of 256×256, an illumination block size of 8×8 and a disparity block size of 16×16 have been found to yield good results.

Let Y'(i,j) represent a vector of length L(M×N) of the concatenated block Y(i,j) and X'(i+d_i,j+d_j) represent a vector of length L of the concatenated block X(i+d_i,j+d_j). The least squares solution for a can be expressed as $$a(i+d_i, j+d_j) = \frac{\langle Y'(i, j), X'(i+d_i, j+d_j)\rangle}{\langle X'(i+d_i, j+d_j), X'(i+d_i+j+d_j)\rangle}$$

Alternate block matching methods include, but are not limited to variable size block matching (VSBM) as described by, for instance, Yu et al in "Variable size block matching motion compensation with applications to video coding", IEE Proceedings, Vol 137, Pt. 1, No. 4, August 1990, the contents of which are hereby incorporated by reference. Their scheme starts with relatively large blocks, which are then repeatedly divided, this is a so-called top down approach. If the best matching error for a block is above some threshold, the block is divided into four smaller blocks, until the maximum number of blocks or locally minimum errors are obtained. The application of such top-down methods may generate block structures for an image that match real features.

One of ordinary skill in the art will appreciate that other techniques besides block matching may be used to find the mapping between the two images. Suitable techniques to perform the mapping include, but are not limited to, the well-known optical flow methods, the well-known techniques for disparity estimation between two images for stereo, and pixel recursive methods. Once mappings between the images are found, the general technique for measuring insertions, deletions and substitutions described above may be applied to obtain an image edit distance.

The similarity score is given as the complement of the edit distance. If the edit distance is normalized to lie between 0 and 1, the similarity score between two images X and Y, S(X,Y), is simply given by the equation:

$$S(X,Y)=1-D(X,Y)$$

The edit distances may be computed in two directions, from gallery to probe and from probe to gallery resulting in different measures. A final similarity score may be a combination of the forward and backward edit scores or $$S_{final}(X,Y)=\lambda_f(1-D_f(X,Y))+\lambda_b(1-D_b(X,Y))$$

where $D_f$ is the forward edit distance (mapping probe image to gallery image), $D_b$ is the backward edit distance (mapping gallery image to probe image) and $\lambda_f, \lambda_b$ are scalar weights. In many applications, the optimum weights have been found to be approximately 0.5 indicating that the errors between the forward and backward mappings are statistically independent.

Figure 2:
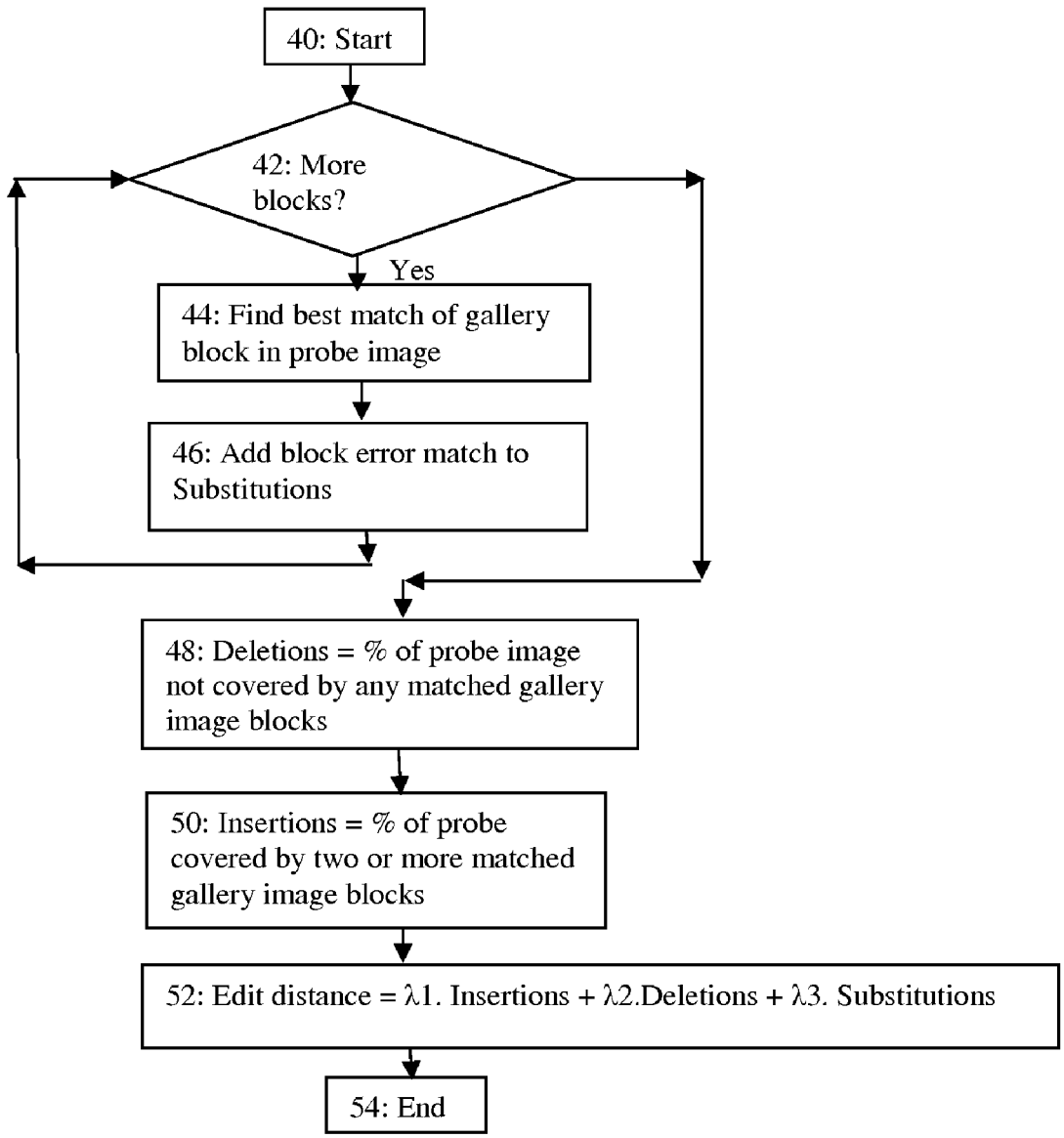
FIG. 2 is a flow diagram showing steps in calculating an edit distance.

FIG. 2 is a flow diagram showing steps in calculating an edit distance.

In step 40, a suitably programmed digital processor 36 proceeds to start determining an edit distance between a gallery image 14 and a probe image 12.

In step 42, the suitably programmed digital processor 36 checks to see if there are more blocks to match. If they are, the process proceeds to step 44, in which the suitably programmed digital processor 36 finds the best match of the current gallery block in the probe image. The matching may use any suitable mapping including, but not limited to, the block matching techniques described above. The matching may be exhaustive and range over the entire probe image 12, which may be a different size to the gallery image 14. Alternatively, the attempt at matching may be confined to a sub-region 22 of the probe image 12. The sub-region 22 may be related to where the block of pixels 16 occurred in the gallery image 14.

In step 46, any errors in the block matching found in step 44 may be accumulated and used to represent the amount of substitution. The substitution may, for instance, be equated to the actual error measures from the block matching. Alternately, the substitution may be equated to the count of errors above a predetermined threshold or the actual error values above a certain threshold or the actual errors in a predetermined range. In a further embodiment, the substitution may also be associated with some measure of a locally determined scalar value that compensates for the illumination differences. It may, for instance, consist of using the values directly or using a measure of smoothness such as the first order difference between the scalar values.

The suitably programmed digital processor 36 then proceeds back to step 42 to check if there are more blocks to be matched. Once all the blocks that make up the gallery image 14, or a suitable subset of them deemed sufficient for a particular matching task, have been matched, the suitably programmed digital processor 36 proceeds to step 48. In step 48, the probe image 12 is examined to find the percentage of the probe image 12 that has not been included in any of the matches made in step 44. For the purpose of determining an image edit distance, the amount of deletion may be equated to the percentage of the probe image not covered by any of the matched gallery blocks.

In step 50, the probe image 12 is examined to determine the percentage of the probe image 12 that is simultaneously involved in two or more matches of the blocks from the gallery image 14. For the purpose of determining an image edit distance, the amount of insertion may be equated to the percentage of the probe image that is simultaneously involved in two or more matches of the blocks from the gallery image 14.

The suitably programmed digital processor 36 then proceeds to step 52 and calculates the minimum edit distance. The minimum edit distance between may be given by the equation:

$$D(X,Y)=\lambda 1(\% \text{ one-to-none})+\lambda 2(\% \text{ one-to-many})+\lambda 3 \text{ (sum block errors)}$$

Or $$D(X,Y)=\lambda 1(\% \text{ Deletion})+\lambda 2(\% \text{ Insertion})+\lambda 3(\text{sum block errors})$$

where X and Y are the probe and gallery images and $\lambda 1, \lambda 2$ and $\lambda 3$ are cost functions associated with the different types of errors. For instance, if the images are captured in a very uncontrolled environment where the poses between gallery and probe can be widely varying, the weights for the one-to-none and one-to-many scores may be lowered because we expect to get more insertions and deletions than between like images.

Figure 3:
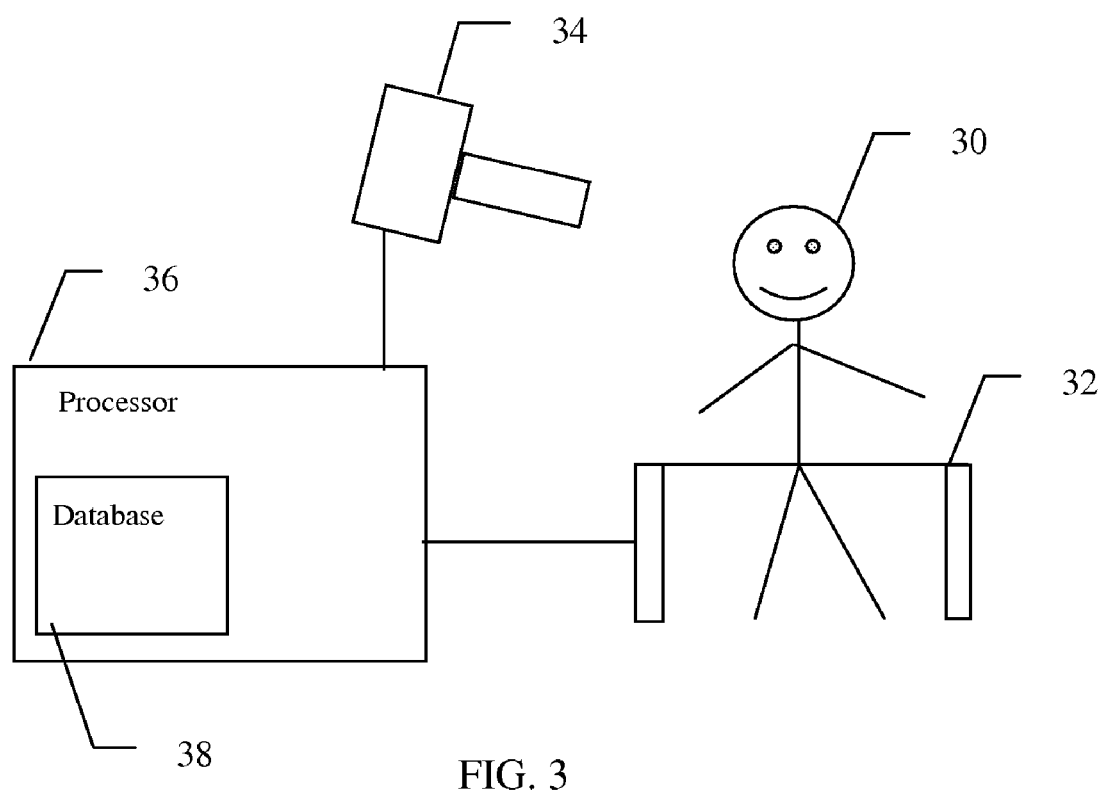
FIG. 3 is a schematic representation of a face recognition system.

FIG. 3 is a schematic representation of an exemplary face recognition system.

A person 30 is attempting to gain entry to a secure area via a turnstile 32 that is under the control of a face recognition application running on the suitably programmed digital processor 36. The system makes use of the camera 34 that may for instance, be a color, or a black and white, digital, still or video camera that may be directly or wirelessly connected to the suitably programmed digital processor 36 which may itself be remote from the turnstile 32. When the person 30 approaches the closed turnstile 32, the camera 34 takes one or more images of the person 30. Those images are sent to the suitably programmed digital processor 36 that proceeds to compare the image with a database 38 of images of people who have previously been authorized to enter the secure area via the turnstile 32. The suitably programmed digital processor 36 proceeds to calculate the image edit distance between the new image of the person 30 and the images of the database 38. If one of the image edit distances is less than a predetermined threshold, the suitably programmed digital processor 36 makes the decision that the person 30 has been recognized as being an authorized user and sends a signal to the turnstile 32 to open.

Figure 4:
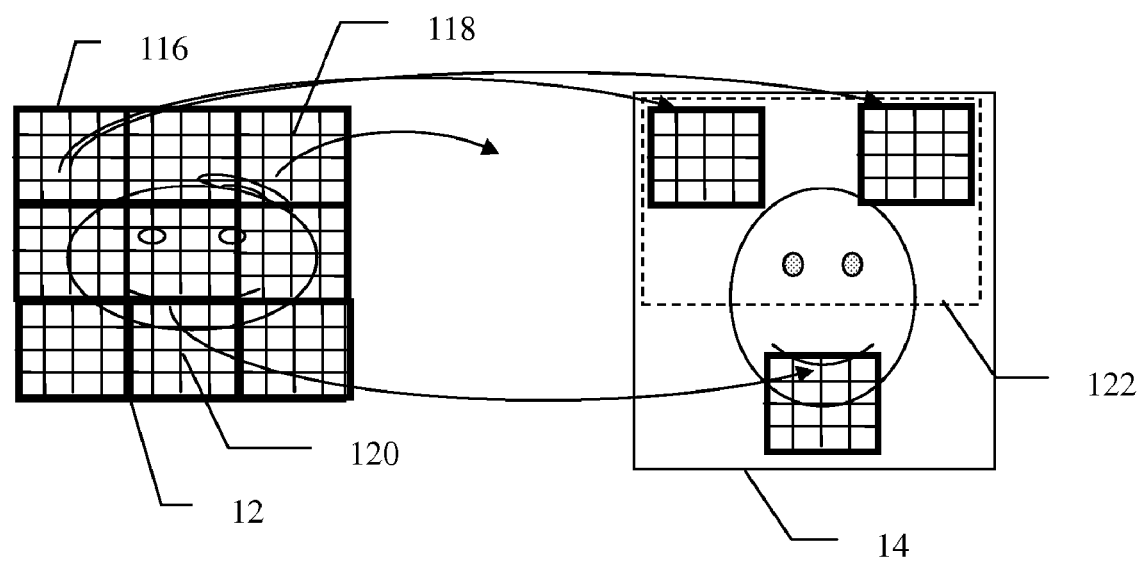
FIG. 4 is a schematic representation of a further embodiment of a method of creating an edit distance by matching blocks of pixels from one image to a second image.

FIG. 4 is a schematic representation of a further embodiment of a method of creating an edit distance by matching blocks of pixels from one image to a second image.

In order to compare a gallery image 112 to a probe image 114, the gallery image 112 is first divided into a set of blocks of pixels, such as, but not limited to, a block of pixels 116, a block of pixels 118 and a block of pixels 120. For each of the blocks of pixels that make up the gallery image 112, an attempt is made to find a mapping or a close match in the probe image 114. In this embodiment of the invention, there are three possible outcomes to this attempt to find a match.

There can be a one-to-many mapping as illustrated by the block of pixels 116 that is finds a close match to two regions in the probe image 114. For the purposes of obtaining an image edit distance, this one-to-many mapping may be recorded as an insertion.

There can be a one-to-none mapping as illustrated by the block of pixels 18 that does not find a sufficiently close match in the probe image 114. For the purposes of obtaining an image edit distance, this one-to-none mapping may be recorded as a deletion.

There can be a one-to-one mapping that has some degree of mismatch or error as illustrated by the block of pixels 120. For the purposes of obtaining an image edit distance, this one-to-one mapping may be characterized as a substitution if the error in this is greater than a predetermined value.

Once a sufficient number of blocks have been mapped, or attempted to be mapped from the gallery image 112 to the probe image 114, an image edit distance may be calculated as a weighted sum of the insertions, deletions and substitutions, or some suitable combination thereof. This image edit distance may then be used as a measure of how similar the images are.

The substitutions may be determined from the block matching errors in a number of ways. The substitutions may, for instance, be equated to the gallery image blocks that have only one close match in the probe image, but in which the errors in that close match are above a predetermined threshold. The substitutions may also be equated to either the sum of the block matching errors in all gallery image blocks that only have one close match in the probe image, or the substitutions may be equated to the block matching errors in all gallery image blocks that have close matches in the probe image.

In this embodiment of the invention, the reverse process of mapping blocks from the probe image 114 to the gallery image 112 may also be performed and the image edit distance may be calculated as the weighted sum of the combined insertions, deletions and substitutions, or some suitable combination thereof.

Figure 5:
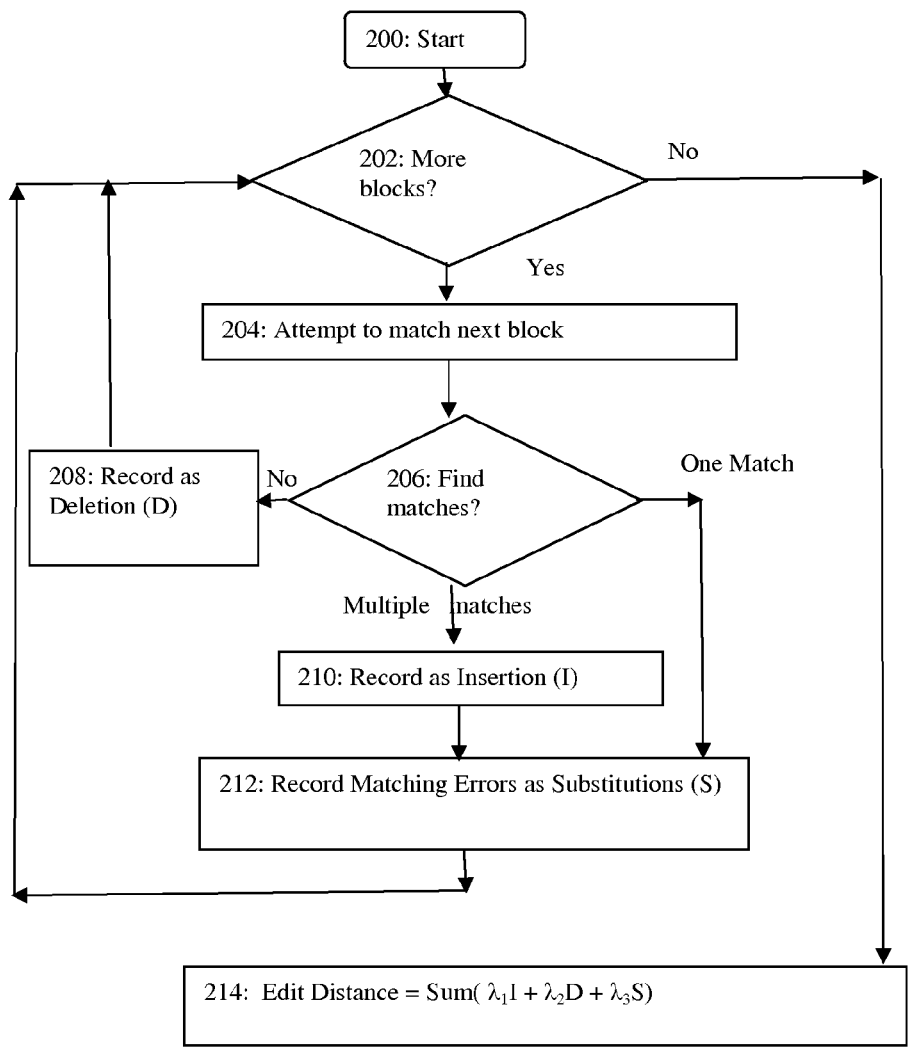
FIG. 5 is a flow diagram showing steps in a further embodiment of calculating an edit distance.

FIG. 5 is a flow diagram showing steps in a further embodiment of calculating an edit distance.

In step 200, a suitably programmed digital processor 36 starts to compare two images. In step 202 the processor determines if there are more blocks of the gallery image 112 that need to be matched. If there are, the processor proceeds to step 204 and attempts to match the next block. The matching may use any suitable mapping including, but not limited to, the block matching techniques described above. The attempt at matching may be exhaustive and range over the entire probe image 114, which may be a different size to the gallery image 112. Alternatively, the attempt at matching may be confined to a sub-region 122 of the probe image 114. The sub-region 122 may be related to where the block of pixels 16 occurred in the gallery image 112.

In step 206 the suitably programmed digital processor 36 determines whether one or more close matches have been found for the current block. This determination typically takes the form of a match that that has errors below a predetermined threshold. If no close matches are found, the suitably programmed digital processor 36 records the attempt as a deletion in step 208. If more than one match is found, the suitably programmed digital processor 36 records this as the appropriate number of insertions in step 210.

If one match is found, the suitably programmed digital processor 36 proceeds to step 212 and records any errors in the matching as substitutions. Depending on the implementation, the substitutions may be scored in a number of ways. There may be two predetermined thresholds, so that a matching that is less than a first predetermined threshold but above the second, lower, predetermined threshold may be considered a substitution. A score that is above the first, higher threshold may not be considered a match, and a match that is lower than both thresholds may be considered a match. Alternately, the substitutions recorded by the suitably programmed digital processor 36 in step may simply be the sum of all the matching errors in the single match cases. In a further preferred embodiment, the substitutions recorded by the suitably programmed digital processor 36 in step may be the sum of all the matching errors in both the single match cases and the multiple match cases.

Once the suitably programmed digital processor 36 has made a determination concerning a block of pixels, it loops back to step 202 to see if there are any further blocks of pixels to be processed. If there are no further blocks to be processed, the suitably programmed digital processor 36 proceeds to step 214 and calculates the image edit distance.

The minimum edit distance between may be given by the equation:

$$D(X,Y)=\lambda 1(\% \text{ one-to-none})+\lambda 2(\% \text{ one-to-many})+\lambda 3 \text{ (sum block errors)}$$

Or $$D(X,Y)=\lambda 1(\% \text{ Deletions})+\lambda 2(\% \text{ Insertions})+\lambda 3(\text{sum block errors})$$

where X and Y are the probe and gallery images and $\lambda 1$, $\lambda 2$ and $\lambda 3$ are cost functions associated with the different types of errors. For instance, if the images are captured in a very uncontrolled environment where the poses between gallery and probe can be widely varying, the weights for the one-to-none and one-to-many scores may be lowered because we expect to get more insertions and deletions than between like images.

The edit distance has been described above with reference to a two-dimensional image. One of ordinary skill in the art will readily appreciate that the novel methods of obtaining an edit distance of this invention may be extended to three or more dimensions. In three dimensions, the representation of the object would be divided into blocks of voxels that may be cubic. Attempts to find matches of each cube of voxels from a first 3D representation may then on a second 3D representation using techniques that are analogous to the block matching described above. Volumes of one-to-many matches may be equated to a degree of insertion, volumes of one-to-none matches may be equated to a degree of deletion and errors in matches may be equated to the degree of substitution required to transform the one 3D representation into the other. A 3D minimum edit distance may be obtained as a weighted sum of the minimum degrees of insertion, deletion and substitution required to transform the one image into the other. Generalizations of the method to higher dimensions would also be possible using higher dimension structures analogous to the 2D blocks of pixels and 3D cubes of voxels.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

Modifications may readily be devised by those ordinarily skilled in the art without departing from the spirit or scope of the present invention.

What is claimed is:

1. A system for comparing images comprising a computer having software installed thereon, said software performing the functions of:
   representing a first image as a set of blocks of pixels;
   matching each of said blocks from said first image to a second image;
   recording a substitution as comprising matching errors of said matching of said blocks;
   recording a deletion as comprising a first portion of said second image not involved in said matching said blocks;
   recording an insertion as comprising a second portion of said second image involved in matching more than one of said blocks; and
   determining an image edit distance between said first and second image comprising said substitution, said deletion and said insertion.

2. The system of claim 1 wherein said substitution further comprises a sum of said errors of said matching said blocks.

3. The system of claim 2 wherein said substitution further comprises said errors exceeding a predetermined threshold.

4. The system of claim 2 wherein said deletion further comprises a percentage of said second image not involved in said matching said blocks, and wherein said insertion further comprises a percentage of said second image involved in matching more than one of said blocks.

5. The system of claim 4 wherein said image edit distance is given by the equation:

$$D(X,Y) = \lambda_1(\% \text{ that is Deletion}) + \lambda_2(\% \text{ that is Insertion}) + \lambda_3(\text{Substitutions})$$

where $\lambda_1$, $\lambda_2$ and $\lambda_3$ are cost weighting functions.

6. The system of claim 5 said software further performing the function of normalizing said edit image distance to lie between 1 and 0 and defining a similarity score by the equation:

$$S(X,Y) = 1 - D(X,Y).$$

7. The system of claim 5 said software further performing the function of normalizing said edit image distance to lie between 1 and 0 and defining a final similarity score as a combination of the forward and backward edit scores as defined by the equation:

$$S_{final}(X,Y) = \lambda_f(1 - D_f(X,Y)) + \lambda_b(1 - D_b(X,Y))$$

where $D_f$ is the forward edit distance, $D_b$ is the backward edit distance and $\lambda_f$, $\lambda_b$ are scalar weights.

8. The system of claim 1, said software further performing the functions of:
   representing said second image as a second set of blocks of pixels;
   matching each of said second set of blocks from said second image to said first image;
   recording a second substitution as comprising said errors of said matching said second set of blocks;
   recording a second deletion as comprising a first portion of said first image not involved in said matching said second set of blocks;
   recording a second insertion as comprising a second portion of said first image involved in matching more than one of said second set of blocks; and
   determining an image edit distance between said first and second image comprising said substitution, said second substitution, said deletion, said second deletion, said insertion and said second insertion.

9. A computer-readable medium, comprising instructions for:
   representing a first image as a set of blocks of pixels;
   matching each of said blocks from said first image to a second image;
   recording a substitution as comprising matching errors of said matching of said blocks;
   recording a deletion as comprising a first portion of said second image not involved in said matching said blocks;
   recording an insertion as comprising a second portion of said second image involved in matching more than one of said blocks; and
   determining an image edit distance between said first and second image comprising said substitution, said deletion and said insertion.

10. The computer-readable medium of claim 9 further comprising instructions for recording said substitution as further comprising a sum of said errors of said matching said blocks.

11. The computer-readable medium of claim 10 further comprising instructions for, recording said deletion as further comprising a percentage of said second image not involved in said matching said blocks, and for recording said insertion as further comprising a percentage of said second image involved in matching more than one of said blocks.

12. The computer-readable medium of claim 11 further comprising instructions for, determining said image edit distance as weighted sum of said substitution, insertion and deletion.

13. A computing device comprising: a computer-readable medium comprising instructions for:
   representing a first image as a set of blocks of pixels;
   matching each of said blocks from said first image to a second image;
   recording a substitution as comprising matching errors of said matching of said blocks;
   recording a deletion as comprising a percentage of said second image not involved in said matching said blocks;
   recording an insertion as comprising a percentage of said second image involved in matching more than one of said blocks; and
   determining an image edit distance between said first and second image as a weighted sum of said substitution, insertion and deletion.

14. A system for comparing images, comprising:
means for capturing a first image;
means for calculating the difference between said first image and each of a database of previously stored images, said means for calculating said difference performing the steps of
representing a first image as a set of blocks of pixels;
matching each of said blocks from said first image to a second image;
recording a substitution as comprising matching errors of said matching of said blocks;
recording a deletion as comprising a first portion of said second image not involved in said matching said blocks;
recording an insertion as comprising a second portion of said second image involved in matching more than one of said blocks; and
determining an image edit distance between said first and second image comprising said substitution, said deletion and said insertion; and
means for recognizing said first image as matching one of said database of previously stored image is said image edit distance is less than a predetermined value.

15. An apparatus for comparing images, comprising:
means for representing a first image as a set of blocks of pixels;
means for matching each of said blocks from said first image to a second image;
means for recording a substitution as comprising matching errors of said matching of said blocks;
means for recording a deletion as comprising one-to-none matching;
means for recording an insertion as comprising a one-to-many matching; and
determining an image edit distance between said first and second image comprising said substitution, said deletion and said insertion.

16. A system for comparing images by calculating an image edit distance between a first image and a second image comprising a computer having software installed thereon, said software implementing the process of:
dividing said first image into a plurality of blocks of pixels;
matching each of said blocks of pixels to a best match block of pixels in said second image;
determining, for each of said blocks of pixels from said first image, a matching error between said block of pixels from said first image and its best match block of pixels from said second image;
determining the portion of said second image not contained in any best match block of pixels;
determining the portion of said second image contained in multiple best match blocks of pixels; and
calculating said image edit distance as the weighted sum of the matching errors for all blocks of pixels, the portion of said second image not contained in any best match blocks and the portion of said second image containing in multiple best match blocks.

17. The system of claim 16 wherein said best match between each of said blocks of pixels from said first image and a block of pixels from said second image is determined using a block matching algorithm which generates said matching error, said matching error being an error value or an error count representing a measure of the difference between each of said block of pixels from said first image and its best match block of pixels from said second image.

18. The system of claim 17 wherein said block matching algorithm may contain a factor to compensate for differences in illumination between said first image and said second image.

19. The system of claim 16 wherein said matching error for each of said blocks of pixels in said first image is selected from a group consisting of the actual error values from said block matching algorithm, the actual error values from said block matching algorithm above a certain threshold, the count of errors from and the count of error above a certain threshold.

20. The system of claim 16 wherein a second image edit distance may be obtained by swapping said first and said second images and repeating the process of claim 17 and further wherein the similarity between said first and second images may be represented as a combination of both image edit distances.

* * * * *